United States Patent
Lin et al.

(10) Patent No.: US 11,750,127 B2
(45) Date of Patent: Sep. 5, 2023

(54) CONTROL METHOD FOR BALANCING SCALING ERRORS OF MULTIPLE CURRENT SENSORS FOR PMSM

(71) Applicants: ZHEJIANG UNIVERSITY ADVANCED ELECTRICAL EQUIPMENT INNOVATION CENTER, Zhejiang (CN); ZHEJIANG UNIVERSITY, Zhejiang (CN)

(72) Inventors: Zhichen Lin, Zhejiang (CN); Tingna Shi, Zhejiang (CN); Zhen Zhang, Zhejiang (CN); Changliang Xia, Zhejiang (CN)

(73) Assignees: ZHEJIANG UNIVERSITY ADVANCED ELECTRICAL EQUIPMENT INNOVATION CENTER, Zhejiang (CN); ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/793,935

(22) PCT Filed: Aug. 3, 2021

(86) PCT No.: PCT/CN2021/110343
§ 371 (c)(1),
(2) Date: Jul. 20, 2022

(87) PCT Pub. No.: WO2022/262091
PCT Pub. Date: Dec. 22, 2022

(65) Prior Publication Data
US 2023/0163704 A1    May 25, 2023

(30) Foreign Application Priority Data
Jun. 17, 2021   (CN) .......................... 202110670546.8

(51) Int. Cl.
*H02P 21/14* (2016.01)
*H02P 21/22* (2016.01)
(Continued)

(52) U.S. Cl.
CPC .......... *H02P 21/14* (2013.01); *H02P 21/0003* (2013.01); *H02P 21/22* (2016.02); *H02P 25/022* (2013.01); *H02P 27/08* (2013.01)

(58) Field of Classification Search
CPC ...... H02P 21/14; H02P 21/0003; H02P 21/22; H02P 25/022; H02P 27/08
See application file for complete search history.

(56) References Cited

U.S. PATENT DOCUMENTS

2010/0085787 A1* 4/2010 Kane ...................... B60K 6/365
                                                          363/123

FOREIGN PATENT DOCUMENTS

| CN | 108418493 | 8/2018 |
| CN | 109167545 | 1/2019 |

(Continued)

OTHER PUBLICATIONS

Dae-Woong Chung, Analysis and Compensation of Current Measurement Error in Vector-Controlled AC Motor Drives, 1998, IEEE, 340-345 (Year: 1998).*

(Continued)

*Primary Examiner* — Bickey Dhakal
(74) *Attorney, Agent, or Firm* — JCIPRNET

(57) ABSTRACT

The invention discloses a control method for balancing scaling errors of multiple current sensors for PMSM. An impedance network is set between a direct current power supply and a three-phase inverter connected to a PMSM to avoid positive and negative poles of the direct current power supply being short-circuited under actions of shoot-through vectors. Under actions of two shoot-through vectors in a (Continued)

PWM cycle, three-phase current sensors are used to respectively sample the sum of currents in each branch of three-phase output branches of the three-phase inverter and a branch of the same bridge arm of the three-phase inverter, according to the sampled currents, operating to obtain the relationship between the scaling error coefficients of the three-phase current sensors. Then, correction coefficients are calculated. The correction of the scaling errors of the current sensors is implemented using correction coefficient feedback control.

5 Claims, 5 Drawing Sheets

(51) Int. Cl.
*H02P 21/00* (2016.01)
*H02P 25/022* (2016.01)
*H02P 27/08* (2006.01)

(56) References Cited

FOREIGN PATENT DOCUMENTS

| | | | | |
|---|---|---|---|---|
| CN | 111510035 | | 8/2020 | |
| CN | 112054732 | | 12/2020 | |
| CN | 112271970 | | 1/2021 | |
| EP | 1729405 A1 | * | 12/2006 | ............ H02P 21/06 |
| JP | 2009232536 | | 10/2009 | |
| JP | 2011050170 | | 3/2011 | |
| WO | WO-2019050276 A1 | * | 3/2019 | ............ H02P 21/00 |

OTHER PUBLICATIONS

Wenjie Wang, Analysis and Compensation of Sampling-Delay Error in Single Current Sensor Method for PMSM Drives, 2022, IEEE, 5918-5927 (Year: 2022).*
"International Search Report (Form PCT/ISA/210) of PCT/CN2021/110343," dated Mar. 15, 2022, pp. 1-5.
"Written Opinion of the International Searching Authority (Form PCT/ISA/237) of PCT/CN2021/110343," dated Mar. 15, 2022, pp. 1-3.
Myoungho Kim et al., "Compensation of Current Measurement Error for Current-Controlled PMSM Drives," IEEE Transactions on Industry Applications, vol. 50, Sep. 2014, pp. 3365-3373.
Hong-Jun Heo et al., "Compensating of common scaling current-measurement error for permanent magnet synchronous motor drives," 2016 IEEE 8th International Power Electronics and Motion Control Conference (IPEMC-ECCE Asia), May 2016, pp. 1-5.
Younghoon Cho et al., "A Three-Phase Current Reconstruction Strategy With Online Current Offset Compensation Using a Single Current Sensor," IEEE Transactions on Industrial Electronics, vol. 59, Jul. 2012, pp. 2924-2933.
Jiadong Lu et al., "Fixed-Point Sampling Strategy for Estimation on Current Measurement Errors in IPMSM Drives," IEEE Transactions on Power Electronics, vol. 36, May 2021, pp. 1-12.

* cited by examiner

CONTROL METHOD FOR BALANCING SCALING ERRORS OF MULTIPLE CURRENT SENSORS FOR PMSM

CROSS-REFERENCE TO RELATED APPLICATION

This application is a 371 of international application of PCT application serial no. PCT/CN2021/110343, filed on Aug. 3, 2021, which claims the priority benefit of China application no. 202110670546.8, filed on Jun. 17, 2021. The entirety of each of the above mentioned patent applications is hereby incorporated by reference herein and made a part of this specification.

TECHNICAL FIELD

The disclosure relates to a control method for balancing a three-phase inverter-permanent magnet synchronous motor (PMSM) in the field of PMSM control, and in particular to a control method for balancing scaling errors of multiple current sensors applied in three-phase inverter-PMSM control.

DESCRIPTION OF RELATED ART

Due to a relatively high power density, the PMSM has been widely applied in application scenarios such as electric vehicles, rail transit, and household appliances. The high performance control of the PMSM relies on accurate stator current feedback. In order to obtain an accurate three-phase current value of the motor, a current sensor, a corresponding analog signal processing circuit, and an analog/digital conversion module are indispensable. However, as parameters of the current sensor and the corresponding processing circuit change, different current sampling errors are generated between the current sensors. The current sampling errors include offset errors and scaling errors. The offset errors introduce fluctuations in the fundamental frequency of the motor into the torque, and the scaling errors introduce fluctuations in twice the fundamental frequency of the motor into the torque.

In order to eliminate the influence of the current sampling errors on the control performance of the motor, various compensation strategies of the current sampling errors have been proposed. The conventional solutions may be divided into two types. One type of methods implements the estimation and compensation of the current sampling errors through an observer or an analytical method. M. Kim and S. Sul et al. used stator voltage errors to respectively extract the offset errors and the scaling errors of the current sensors, so as to implement the compensation of the current sampling errors in the steady state (IEEE Trans. Ind. Appl., vol. 50, no. 0.9, pp. 3365-3373, September 2014). When dealing with the scaling errors in the prior art, the scaling errors of multiple current sensors are generally balanced, so that the current sensors have the same scaling error coefficients, and accurate scaling error coefficients are not obtained. In order to solve the issue, H. Heo and S. Hwang et al. obtained values of an integral term of a current loop PI regulator twice through giving two different reference values for a q-axis current at a specific rotational speed, and find the difference to obtain the relationship between the scaling error coefficients and the accurate scaling error coefficients, thereby implementing the accurate correction of the scaling error coefficients (Proc. IPEMC-ECCE Asia, 2016, pp. 374-378).

Another type of method avoids the influence of the current sampling errors on the control performance of the motor through a special hardware structure. The single current sensor sampling-three-phase current reconstruction technology can implement the high performance control of the motor using one current sensor. Since only one current sensor is used, the method avoids the influence of imbalance of the scaling errors of multiple current sensors. On this basis, Y. Cho and T. LaBella et al. provided a current sensor sampling offset error compensation method applied to the single current sensor sampling-three-phase current reconstruction technology, which further eliminated the influence of the current sensor sampling errors (IEEE Trans. Ind. Electron., vol. 59, no. 7, pp. 2924-2933, July 2012). Different from the single current sensor sampling-three-phase current reconstruction technology, J. Lu and Y. Hu et al. proposed another hardware structure to implement the estimation and compensation of the current sampling errors of three-phase current sensors in the PMSM control driven by a traditional voltage source three-phase inverter. The method uses the current sensors to measure the sum of currents in an output phase branch of the three-phase inverter and a bridge arm branch of the three-phase inverter. Accurate current sampling errors can be obtained through sampling the currents under actions of a zero vector and an active vector, and performing ordinary numerical operations on the sampled values. Since the special hardware structure is adopted, the type of methods often needs to perform current sampling in a specific vector. When the length of the vector required for sampling is not enough to complete one sampling, the sampling fails. In a vector plane, a region where sampling failure may occur is referred to as a sampling dead zone (IEEE Trans. Power Electron., vol. 36, no. 5, pp. 5748-5759, May 2021).

SUMMARY

The objective of the disclosure is to overcome the deficiencies in the prior art by providing a method for balancing scaling errors of multiple current sensors that can eliminate sampling dead zones distributed in a high modulation region and improve the utilization rate of a direct current voltage.

The method of the disclosure performs current sampling under actions of shoot-through vectors, and implements the pumping of a bus voltage of a three-phase inverter at the same time without the issue of the sampling dead zones, and the operating range of a motor is expanded.

As shown in FIG. 1, the objective of the disclosure is implemented through the following technical solutions.

1) An impedance network is set between a direct current power supply and the three-phase inverter connected to a permanent magnet synchronous motor to avoid positive and negative poles of the direct current power supply being short-circuited under the actions of the shoot-through vectors;

2) Under the actions of two shoot-through vectors in one PWM cycle of the three-phase inverter, three-phase current sensors are used to respectively sample the sum of currents in each of three-phase output branches of the three-phase inverter and the same bridge arm branch of the three-phase inverter to obtain one sampled current of each of three phases, then, the relationship between the scaling error coefficients of the three-phase current sensors is obtained by performing operations according to the sampled currents;

3) Correction coefficients are calculated through the relationship between the scaling error coefficients of the three-phase current sensors, and the correction of the scaling errors of the current sensors is implemented using correction coefficient feedback control.

The impedance network in step 1) includes a first inductor $L_1$, a second inductor $L_2$, a first capacitor $C_1$, a second capacitor $C_2$, and a switching transistor S0, an original direct current power supply uin is connected in parallel to the three-phase inverter, that is, two ends of the direct current power supply $u_{in}$ are respectively connected to two bridge arm branches of the three-phase inverter, the first capacitor $C_1$ is connected in parallel to two ends of the direct current power supply uin, the first inductor $L_1$, and the switching transistor S0 connected in series, the first inductor $L_1$, the switching transistor S0, and the second inductor $L_2$ are sequentially connected in series between a positive pole of the direct current power supply uin and one of the bridge arm branches of the three-phase inverter, the second capacitor $C_2$ is connected in parallel to two ends of the switching transistor S0 and the second inductor $L_2$ connected in series, an emitter of the switching transistor S0 is connected to the positive pole of the direct current power supply uin through the first inductor $L_1$, a collector of the switching transistor S0 is connected to the second inductor $L_2$.

The switching transistor $S_0$ adopts a MOS transistor or an IGBT transistor.

In the step 2), the bridge arm branch of the three-phase inverter refers to a branch between a node after connecting lower bridge arms of two phases and a lower bridge arm of the remaining phase.

In the step 2), in one PWM cycle of the three-phase inverter, one shoot-through vector is inserted when an upper bridge arm and a lower bridge arm of a phase A are respectively turned on: a state of upper bridge arms and lower bridge arms of a phase B and a phase C being all turned on and only the upper bridge arm of the phase A being turned on is used as a shoot-through vector $V_{APsh}$, a state of the upper bridge arms and the lower bridge arms of the phases B and C being all turned on and only the lower bridge arm of the phase A being turned on is used as a shoot-through vector $V_{ANsh}$.

Then, in the cases of the shoot-through vector $V_{APsh}$ and the shoot-through vector $V_{ANsh}$, sampled current values are respectively collected and obtained through the three-phase current sensors. Then, the relationship between the scaling error coefficients of the three-phase current sensors is obtained according to the following formula, which is expressed as:

$k_A:k_B:k_C = \Delta i_{AM}:\Delta i_{BM}:\Delta i_{CM}$ $\Delta i_{AM}=i_{AMP}-i_{AMN}, \Delta i_{BM}=i_{BMP}-i_{BMN}, \Delta i_{CM}=i_{CMP}-i_{CMN}$ where $\Delta i_{AM}$ is the difference between the sampled current values of the current sensor of the phase A under the shoot-through vectors $V_{APsh}$ and $V_{ANsh}$, $i_{AMP}$ is the sampled current value of the current sensor of the phase A under the shoot-through vector $V_{APsh}$, $i_{AMN}$ is the sampled current value of the current sensor of the phase A under the shoot-through vector $V_{ANsh}$; $\Delta i_{BM}$ is the difference between the sampled current values of the current sensor of the phase B under the shoot-through vectors $V_{APsh}$ and $V_{ANsh}$, $i_{BMP}$ is the sampled current value of the current sensor of the phase B under the shoot-through vector $V_{APsh}$, $i_{BMN}$ is the sampled current value of the current sensor of the phase B under the shoot-through vector $V_{ANsh}$; $\Delta i_{CM}$ is the difference between the sampled current values of the current sensor of the phase C under the shoot-through vectors $V_{APsh}$ and $V_{ANsh}$, $i_{CMP}$ is the sampled current value of the current sensor of the phase C under the shoot-through vector $V_{APsh}$, $i_{CMN}$ is the sampled current value of the current sensor of the phase C under the shoot-through vector $V_{ANsh}$; $k_A$, $k_B$, $k_C$ are respectively the scaling error coefficients of the current sensors of the phase A, the phase B, and the phase C.

In Step 3), the relationship between the scaling error coefficients of the three-phase current sensors is substituted into the following formula:

$$\begin{cases} x \cdot k_A = y \cdot k_B = z \cdot k_C \\ x \cdot y \cdot z = 1 \end{cases}$$

Then, three correction coefficients x, y, and z are obtained:

$$\begin{cases} x = \sqrt[3]{\Delta i_{BM} \cdot \Delta i_{CM}/\Delta i_{AM}^2} \\ y = \sqrt[3]{\Delta i_{AM} \cdot \Delta i_{CM}/\Delta i_{BM}^2} \\ z = \sqrt[3]{\Delta i_{AM} \cdot \Delta i_{BM}/\Delta i_{CM}^2} \end{cases}$$

where x, y, and z are respectively the correction coefficients of the current sensors of the phase A, the phase B, and the phase C.

Corrected three-phase currents are processed and obtained using the following formula according to the correction coefficients:

$$\begin{cases} i_{Ao} = x \cdot i_{AMP} - x \cdot i_{AMN} \\ i_{Bo} = y \cdot i_{BMP} - x \cdot i_{AMN} \\ i_{Co} = z \cdot i_{CMP} - x \cdot i_{AMN} \end{cases}$$

Where $i_{Ao}$, $i_{Bo}$, and $i_{Co}$ are the corrected currents of the phase A, the phase B, and the phase C.

Finally, the corrected three-phase currents are fed back to a current loop of the permanent magnet synchronous motor for control to eliminate the issue of imbalance of the three-phase currents caused by the scaling error coefficients of the three-phase sensors.

In the step 3), the relationship between the scaling error coefficients of the three-phase current sensors is obtained through taking the difference between the sampled values of the current sensors under the actions of the two different shoot-through vectors.

Compared with the prior art, the beneficial effects brought by the technical solution of the disclosure are:

(1) The disclosure performs current sampling under the actions of the shoot-through vectors and corrects the scaling errors of the current sensors. The zero vector and the active vector are used for speed regulation of the motor, and current sampling and speed regulation of the motor are separated. Therefore, the disclosure is not affected by the influence of the sampling dead zone caused by insufficient lengths of the zero vector and the active vector.

(2) Due to the presence of the impedance network of the disclosure, the shoot-through vector can not only provide a current sampling window, but also implement the pumping-up of the direct current bus voltage of the three-phase inverter, thereby implementing the improvement of the utilization rate of the voltage.

(3) The disclosure can effectively correct the issue of imbalance of the scaling errors of multiple current sensors, thereby eliminating current distortion and torque fluctuations of the motor caused by the imbalance of the scaling errors of the current sensors.

DETAILED DESCRIPTION OF DISCLOSED EMBODIMENTS

The disclosure will be further described in detail below with reference to the drawings and specific embodiments. It should be understood that the specific embodiments described herein are only used to explain the disclosure, but not to limit the disclosure.

The embodiments of the disclosure and the implementation processes thereof are as follows:

1. Layout System

Figure 1:
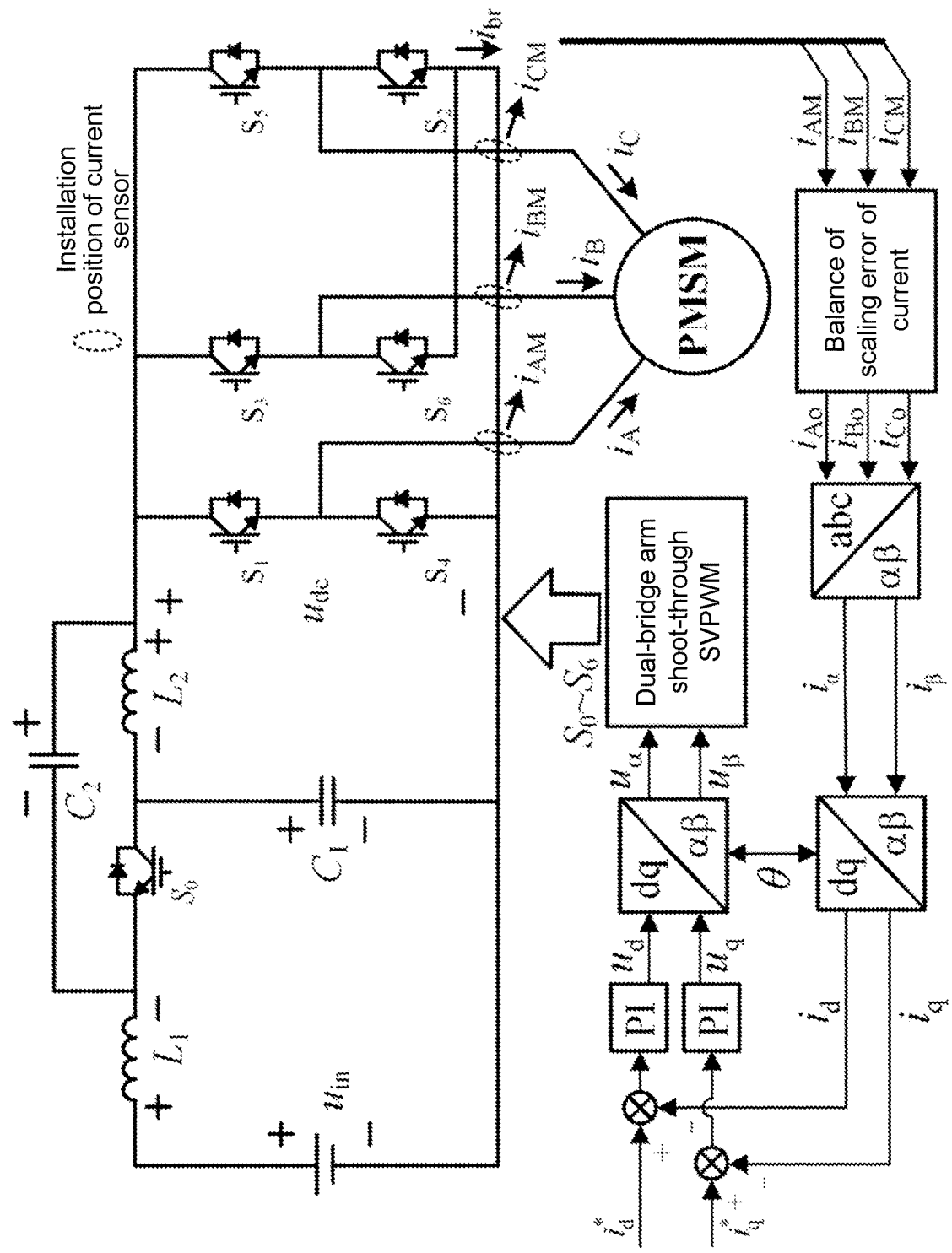
FIG. 1 is a structural block diagram of a method of the disclosure.
Figure 2:
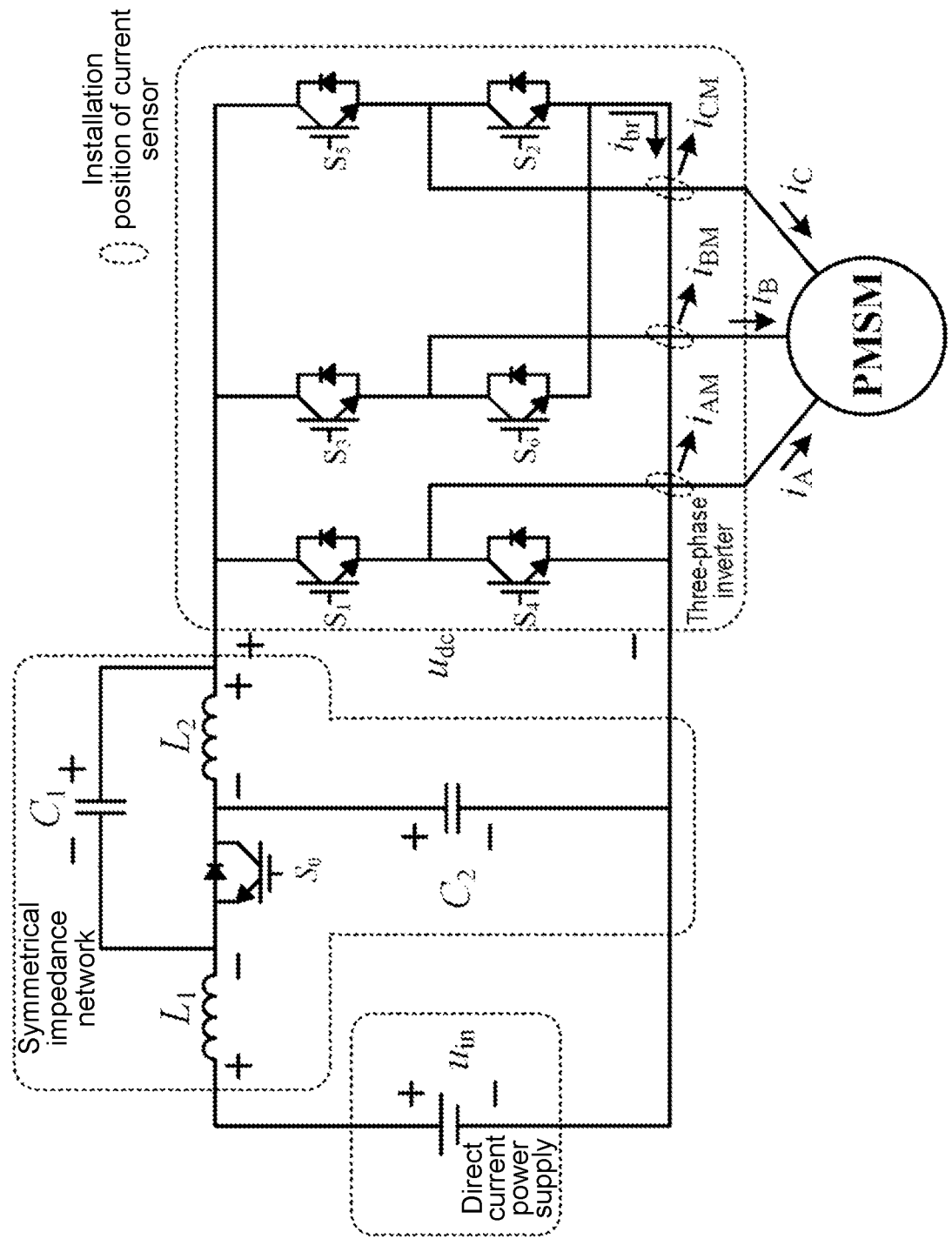
FIG. 2 is a schematic diagram of an installation position of a current sensor.

As shown in FIG. 2, the entire system implemented is composed of a direct current power supply, a symmetrical impedance network, a three-phase inverter, and a permanent magnet synchronous motor PMSM.

In the drawing, $u_{in}$ is the direct current power supply, $i_A$, $i_B$, and $i_C$ are three-phase currents of the permanent magnet synchronous motor PMSM, $L_1=L_2=L$ are respectively a first inductor, a second inductor, and an inductance value thereof of the impedance network, and $C_1=C_2=C$ are a first capacitor, a second capacitor, and a capacitance value thereof of the impedance network.

The system allows upper and lower bridge arms of the same phase of the three-phase inverter to be turned on at the same time, and the state is a shoot-through vector. The shoot-through vector is a voltage vector, and a duty cycle of the shoot-through vector in one PWM cycle is $d_{sh}$.

FIG. 2 shows the structures of the symmetrical impedance network and the three-phase inverter. The pumping of a bus voltage may be implemented through adjusting the duty cycle of the shoot-through vector. At this time, the magnitude of an output voltage of the three-phase inverter may be increased without increasing a modulation coefficient. The feature provides another sampling window for motor control.

2. Sampling Errors of Current Sensors and Installation of Current Sensors to Suppress Sampling Errors One current sensor is installed at an intersection between each of the three-phase output branches of the three-phase inverter and the same bridge arm branch of the three-phase inverter, and three current sensors are installed at three intersections corresponding to the three-phase output branches. Each current sensor simultaneously collects the sum of the current in the respective one-phase output branch and the current of the bridge arm branch.

After the current sensors are installed, considering current sampling errors, sampling values of the current sensors are expressed as:

$$\begin{cases} i_{AM} = k_A(i_A - i_{br}) + e_A \\ i_{BM} = k_B(i_B - i_{br}) + e_B \\ i_{CM} = k_C(i_C - i_{br}) + e_C \end{cases} \quad (1)$$

where $i_{br}$ is the current of the bridge arm branch of the three-phase inverter, $i_{AM}$, $i_{BM}$, and $i_{CM}$ are the sampled current values of the three-phase current sensors, $k_A$, $k_B$, and $k_C$ are the scaling error coefficients of the three-phase current sensors, and $e_A$, $e_B$, and $e_C$ are the offset errors of the three-phase current sensors.

3. Balance of Shoot-Through Vector Sampling-Scaling Errors of Current Sensors

Figure 3:
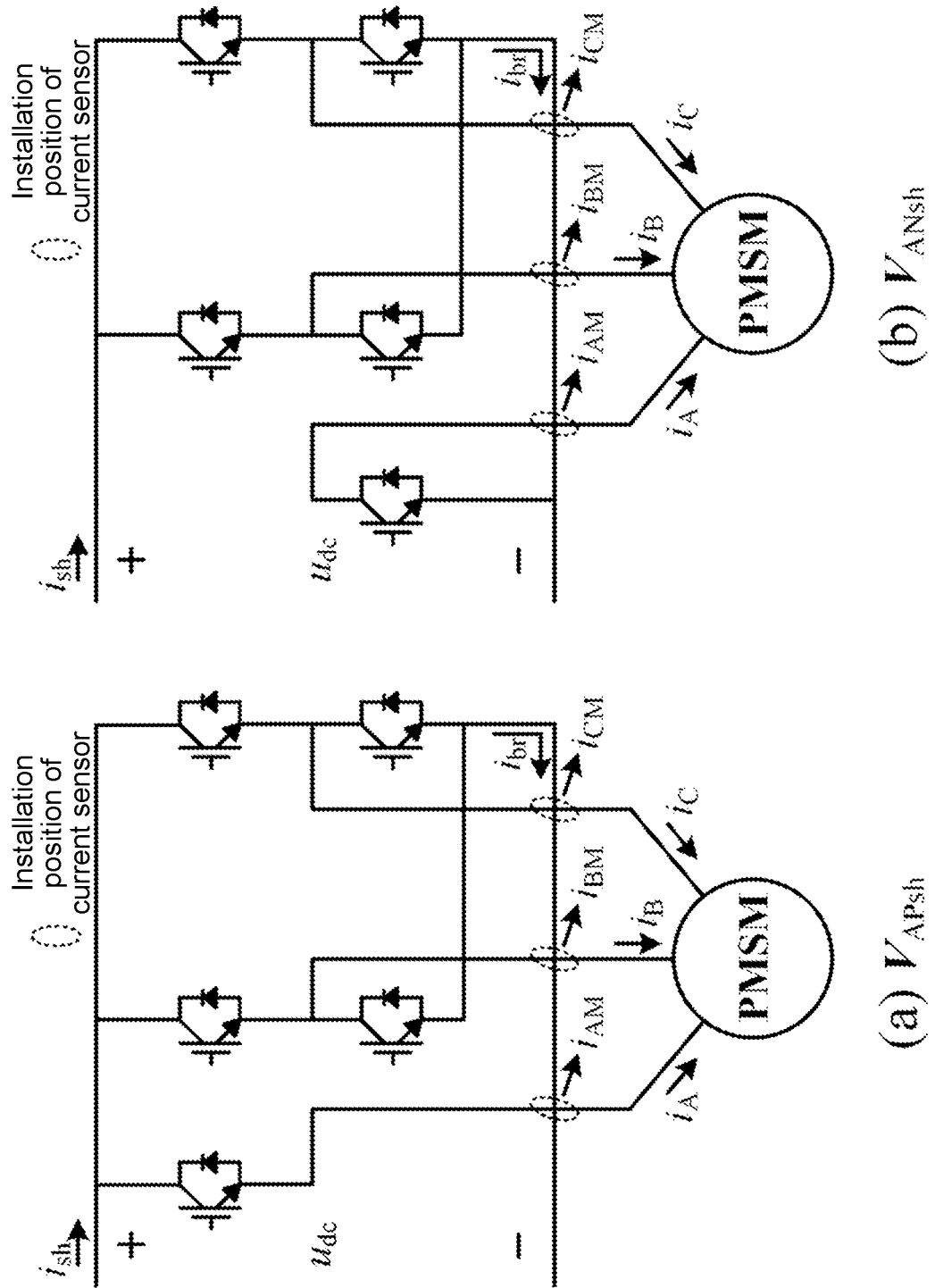
FIG. 3 is a schematic diagram of current flow during shoot-through of two phases.

The system allows the three-phase inverter to work in various shoot-through states, which include three-bridge arm shoot-through, two-bridge arm shoot-through, and single-bridge arm shoot-through. Considering the implementation of current sampling and the current stress of the three-phase inverter comprehensively, the disclosure implements shoot-through vector current sampling by selecting a manner of simultaneous shoot-through of phases B and C. The shoot-through vector when only an upper bridge arm of a phase A is turned on is defined as $V_{APsh}$ and the shoot-through vector when only a lower bridge arm of the phase A is turned on is defined as $V_{ANsh}$. The states of the three-phase inverter corresponding to $V_{APsh}$ and $V_{ANsh}$ are shown in FIG. 3. In FIG. 3, $i_{sh}$ is the shoot-through current when the three-phase inverter is shoot-through.

Three phases of the three-phase inverter are divided into the phase A, the phase B, and the phase C.

In one PWM cycle of the three-phase inverter, one shoot-through vector is inserted when the upper bridge arm and the lower bridge arm of the phase A are respectively turned on: a state of upper bridge arms and lower bridge arms of the phase B and the phase C being all turned on and only the upper bridge arm of the phase A being turned on is used as the shoot-through vector $V_{APsh}$, a state of the upper bridge arms and the lower bridge arms of the phases B and C being all turned on and only the lower bridge arm of the phase A being turned on is used as the shoot-through vector $V_{ANsh}$.

In the specific implementation of the disclosure, the offset errors of the current sensors are compensated when the motor is not working, and the sampling offset errors of the current sensors have been compensated.

Then, in the cases of the shoot-through vector $V_{APsh}$ and the shoot-through vector $V_{ANsh}$, sampled current values are respectively collected and obtained through the three-phase current sensors. Then, the relationship between the scaling error coefficients of the three-phase current sensors is obtained according to the following formula, which is expressed as:

$$k_A : k_B : k_C = \Delta i_{AM} : \Delta i_{BM} : \Delta i_{CM} \quad (2)$$

$$\Delta i_{AM} = i_{AMP} - i_{AMN}, \Delta i_{BM} = i_{BMP} - i_{BMN}, \Delta i_{CM} = i_{CMP} - i_{CMN}$$

where $\Delta i_{AM}$ is the difference between the sampled current values of the current sensor of the phase A under the shoot-through vectors $V_{APsh}$ and $V_{ANsh}$, $i_{AMP}$ is the sampled current value of the current sensor of the phase A under the shoot-through vector $V_{APsh}$, $i_{AMN}$ is the sampled current value of the current sensor of the phase A under the shoot-through vector $V_{ANsh}$;

$\Delta i_{BM}$ is the difference between the sampled current values of the current sensor of the phase B under the shoot-through vectors $V_{APsh}$ and $V_{ANsh}$, $i_{BMP}$ is the sampled current value of the current sensor of the phase B under the shoot-through vector $V_{APsh}$, $i_{BMN}$ is the sampled current value of the current sensor of the phase B under the shoot-through vector $V_{ANsh}$;

$\Delta i_{CM}$ is the difference between the sampled current values of the current sensor of the phase C under the shoot-through vectors $V_{APsh}$ and $V_{ANsh}$, $i_{CMP}$ is the sampled current value of the current sensor of the phase C under the shoot-through vector $V_{APsh}$, $i_{CMN}$ is the sampled current value of the current sensor of the phase C under the shoot-through vector $V_{ANsh}$; $k_A$, $k_B$, $k_C$ are respectively the scaling error coefficients of the current sensors of the phase A, the phase B, and the phase C.

Figure 4:
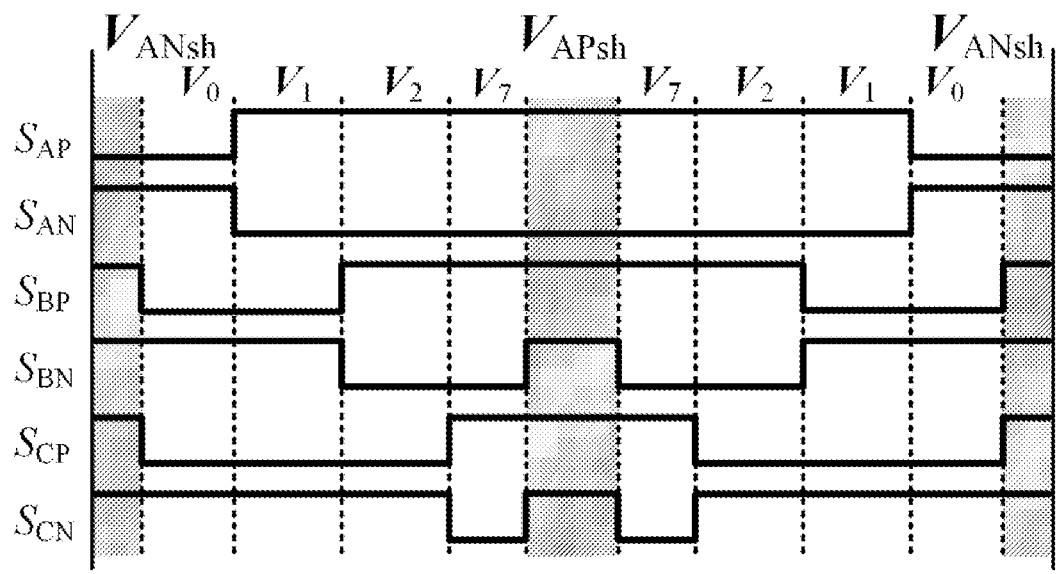
FIG. 4 is a schematic diagram of switching signals of a modulation method of shoot-through of two phases B and C.

In the specific implementation, the corresponding modulation manner is set to implement the insertion of the shoot-through vectors $V_{APsh}$ and $V_{ANsh}$ in one PWM cycle. Taking a reference shoot-through vector being located in a sector I as an example, the diagram of switching signals after inserting the shoot-through vectors $V_{APsh}$ and $V_{ANsh}$ is shown in FIG. 4, where $S_{AP}$, $S_{BP}$, and $S_{CP}$ are respectively the switching signals of the upper bridge arms of the three phases of the three-phase inverter, and $S_{AN}$, $S_{BN}$, and $S_{CN}$ are respectively the switching signals of the lower bridge arms of the three phases of the three-phase inverter.

Figure 5:
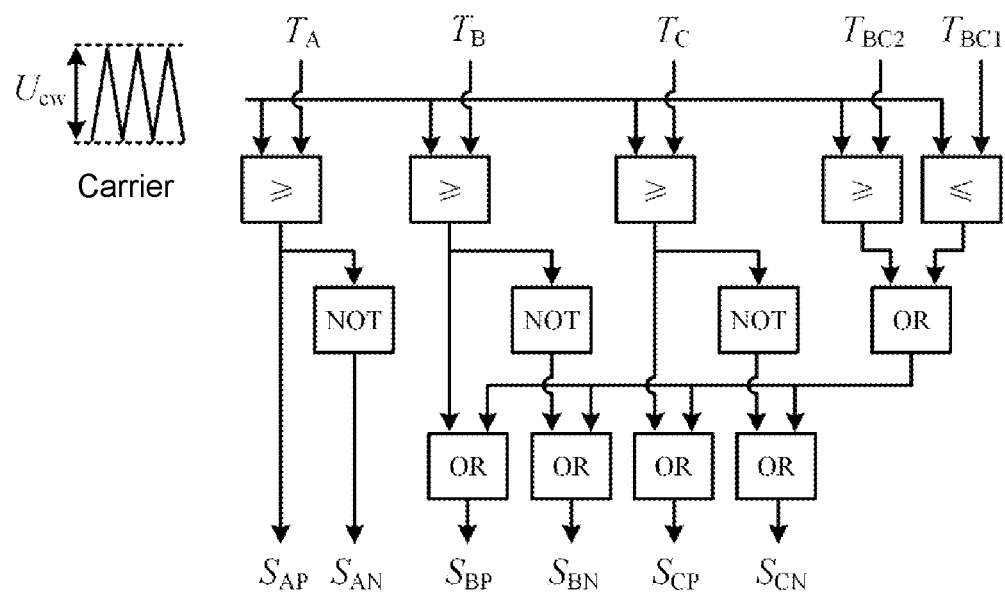
FIG. 5 is a schematic diagram of modulation of shoot-through of two phases B and C.

The implementation of the modulation manner of the switching signals is shown in FIG. 5.

4. Correction Processing

When the scaling error coefficients of the current sensors are different, the relationship between the scaling error coefficients of the three-phase current sensors is substituted into the following formula to balance the scaling error coefficients of the current sensors:

$$\begin{cases} x \cdot k_A = y \cdot k_B = z \cdot k_C \\ x \cdot y \cdot z = 1 \end{cases} \quad (3)$$

Three correction coefficients x, y, and z are obtained:

$$\begin{cases} x = \sqrt[3]{\Delta i_{BM} \cdot \Delta i_{CM}/\Delta i_{AM}^2} \\ y = \sqrt[3]{\Delta i_{AM} \cdot \Delta i_{CM}/\Delta i_{BM}^2} \\ z = \sqrt[3]{\Delta i_{AM} \cdot \Delta i_{BM}/\Delta i_{CM}^2} \end{cases} \quad (4)$$

where x, y, and z are respectively the correction coefficients of the current sensors of the phase A, the phase B, and the phase C.

Corrected three-phase currents are obtained by processing using the following formula according to the correction coefficients:

$$\begin{cases} i_{Ao} = x \cdot i_{AMP} - x \cdot i_{AMN} \\ i_{Bo} = y \cdot i_{BMP} - x \cdot i_{AMN} \\ i_{Co} = z \cdot i_{CMP} - x \cdot i_{AMN} \end{cases} \quad (5)$$

where $i_{Ao}$, $i_{Bo}$, and $i_{Co}$ are the corrected currents of the phase A, the phase B, and the phase C.

Finally, the corrected three-phase currents are fed back to a current loop of the permanent magnet synchronous motor for control to eliminate the issue of imbalance of the three-phase currents caused by the scaling error coefficients of the three-phase sensors.

Figure 6:
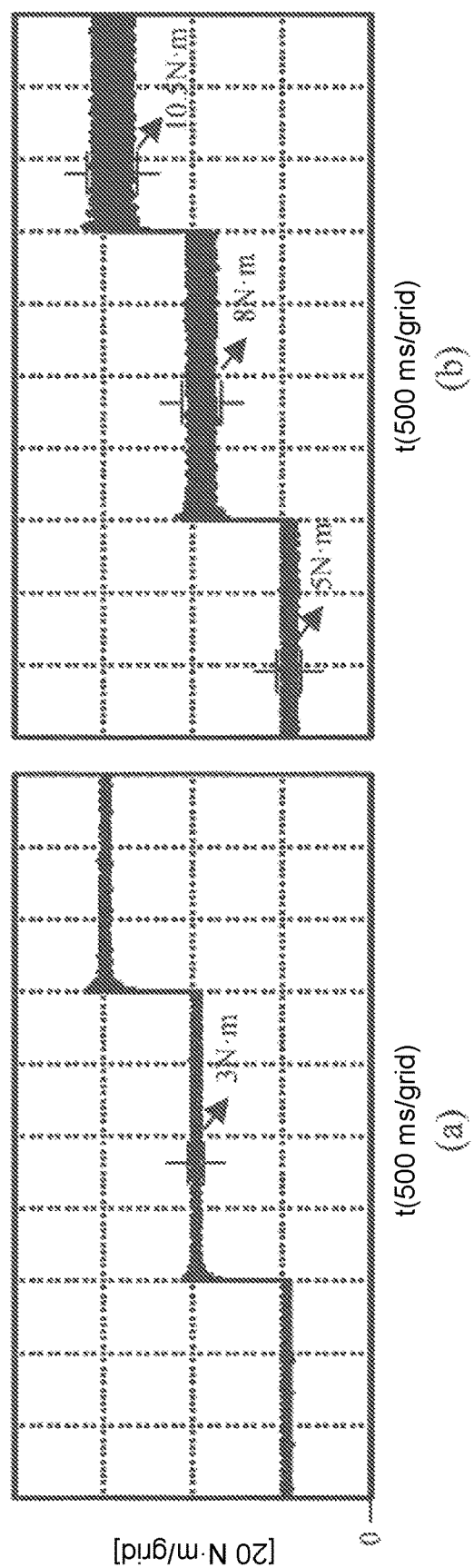
FIG. 6 is a waveform diagram of influence of scaling errors of three-phase current sensors on torque.

FIG. 6 shows the waveforms of the torque of the motor when the three-phase current sensors have no scaling errors and have scaling errors when the motor runs at 1000 r/min and the torque of the motor is respectively 20 N·m, 40 N·m, and 60 N·m. (a) of FIG. 6 shows the waveform of the torque of the motor when the three-phase current sensors have no scaling errors; and (b) of FIG. 6 shows the waveform of the torque of the motor when the three-phase current sensors have scaling errors. In the drawings, T is the torque, which is measured and obtained through using a torque sensor. It can be seen from FIG. 6 that through adopting the technical solution of the disclosure to correct the issue of imbalance of the scaling errors of multiple current sensors, current distortion and torque fluctuations of the motor caused by the imbalance of the scaling errors of the current sensors can be eliminated.

In summary, the embodiments of the disclosure can implement the correction of imbalance of the scaling errors of multiple current sensors through the above steps, thereby eliminating current distortion and torque fluctuations of the motor caused by the imbalance of the scaling errors of the current sensors.

In the embodiments of the disclosure, except for the special description for the model of each device, the models of other devices are not limited, as long as the devices can complete the above functions.

Persons skilled in the art can understand that the drawings are only schematic diagrams of a preferred embodiment, and the serial numbers of the embodiments of the disclosure are only for description and do not represent the ranking of the embodiments.

The disclosure is not limited to the embodiments described above. The above description of the specific embodiments is intended to describe and illustrate the technical solution of the disclosure, and the specific embodiments are only illustrative and not restrictive. Without departing from the spirit of the disclosure and the protection scope of the claims, persons skilled in the art can also make many specific transformations under the teachings of the disclosure, which all fall within the protection scope of the disclosure.

The invention claimed is:

1. A control method for balancing scaling errors of a plurality of current sensors for PMSM, comprising:
    step 1) setting an impedance network between a direct current power supply and a three-phase inverter connected to a permanent magnet synchronous motor to avoid positive and negative poles of the direct current power supply being short-circuited under actions of shoot-through vectors;
    step 2) under the actions of two shoot-through vectors in one PWM cycle of the three-phase inverter, respectively sampling a difference of currents in each branch of three-phase output branches of the three-phase inverter and a bridge arm branch of the three-phase inverter using the three-phase current sensors to obtain a sampled current of each of three phases, and then performing operations according to the sampled currents to obtain a relationship between scaling error coefficients of the three-phase current sensors;
    step 3) calculating correction coefficients through the relationship between the scaling error coefficients of the three-phase current sensors, and implementing correction of scaling errors of the current sensors using a correction coefficient feedback control.

2. The method for balancing the scaling errors of the current sensors sampled under the actions of the shoot-through vectors according to claim 1, wherein: the impedance network in the step 1) comprises a first inductor $L_1$, a second inductor $L_2$, a first capacitor $C_1$, a second capacitor $C_2$, and a switching transistor $S_0$, the direct current power supply $u_{in}$ is connected in parallel to the three-phase inverter, the first capacitor $C_1$ is connected in parallel to two ends of the direct current power supply $u_{in}$, the first inductor $L_1$, and the switching transistor $S_0$ connected in series, the first inductor $L_1$, the switching transistor $S_0$, and the second inductor $L_2$ are sequentially connected in series between the positive pole of the direct current power supply $u_{in}$ and one of bridge arm branches of the three-phase inverter, the second capacitor $C_2$ is connected in parallel to two ends of the switching transistor $S_0$ and the second inductor $L_2$ connected in series.

3. The method for balancing the scaling errors of the current sensors sampled under the actions of the shoot-through vectors according to claim 1, wherein: in the step 2), the bridge arm branch of the three-phase inverter refers to a branch between a node after connecting lower bridge arms of two phases and a lower bridge arm of a remaining phase.

4. The method for balancing the scaling errors of the current sensors sampled under the actions of the shoot-through vectors according to claim 1, wherein: in the step 2), in the one PWM cycle of the three-phase inverter, inserting one shoot-through vector when an upper bridge arm and a lower bridge arm of a phase A are respectively turned on: using a state of upper bridge arms and lower bridge arms of a phase B and a phase C being all turned on and only the upper bridge arm of the phase A being turned on as a shoot-through vector $V_{APsh}$, using a state of the upper bridge arms and the lower bridge arms of the phase B and the phase C being all turned on and only the lower bridge arm of the phase A being turned on as a shoot-through vector $V_{APsh}$;

in cases of the shoot-through vector $V_{APsh}$ and the shoot-through vector $V_{ANsh}$, respectively collecting and obtaining sampled current values through the three-phase current sensors, obtaining the relationship between the scaling error coefficients of the three-phase current sensors according to a following formula expressed as:

$$k_A:k_B:k_C = \Delta i_{AM}:\Delta i_{BM}:\Delta i_{CM}$$

$$\Delta i_{AM} = i_{AMP} - i_{AMN}, \Delta i_{BM} = i_{BMP} - i_{BMN}, \Delta i_{CM} = i_{CMP} - i_{CMN}$$

where $\Delta i_{AM}$ is a difference between the sampled current values of the current sensor of the phase A under the shoot-through vectors $V_{APsh}$ and $V_{ANsh}$, $i_{AMP}$ is the sampled current value of the current sensor of the phase A under the shoot-through vector $V_{APsh}$, $i_{AMN}$ is the sampled current value of the current sensor of the phase A under the shoot-through vector $V_{ANsh}$; $\Delta i_{BM}$ is a difference between the sampled current values of the current sensor of the phase B under the shoot-through vectors $V_{APsh}$ and $V_{ANsh}$, $i_{BMP}$ is the sampled current value of the current sensor of the phase B under the shoot-through vector $V_{APsh}$, $i_{BMN}$ is the sampled current value of the current sensor of the phase B under the shoot-through vector $V_{ANsh}$; $\Delta i_{CM}$ is a difference between the sampled current values of the current sensor of the phase C under the shoot-through vectors $V_{APsh}$ and $V_{ANsh}$, $i_{CMP}$ is the sampled current value of the current sensor of the phase C under the shoot-through vector $V_{APsh}$, $i_{CMN}$ is the sampled current value of the current sensor of the phase C under the shoot-through vector $V_{ANsh}$; $k_A$, $k_B$, $k_C$ are respectively the scaling error coefficients of the current sensors of the phase A, the phase B, and the phase C.

5. The method for balancing the scaling errors of the current sensors sampled under the actions of the shoot-through vectors according to claim 1, wherein: in the step 3), substituting the relationship between the scaling error coefficients of the three-phase current sensors into a following formula:

$$\begin{cases} x \cdot k_A = y \cdot k_B = z \cdot k_C \\ x \cdot y \cdot z = 1 \end{cases}$$

obtaining three correction coefficients x, y, and z:

$$\begin{cases} x = \sqrt[3]{\Delta i_{BM} \cdot \Delta i_{CM}/\Delta i_{AM}^2} \\ y = \sqrt[3]{\Delta i_{AM} \cdot \Delta i_{CM}/\Delta i_{BM}^2} \\ z = \sqrt[3]{\Delta i_{AM} \cdot \Delta i_{BM}/\Delta i_{CM}^2} \end{cases}$$

where x, y, and z are respectively the correction coefficients of the current sensors of a phase A, a phase B, and a phase C;

processing using a following formula according to the correction coefficients to obtain corrected three-phase currents:

$$\begin{cases} i_{Ao} = x \cdot i_{AMP} - x \cdot i_{AMN} \\ i_{Bo} = y \cdot i_{BMP} - x \cdot i_{AMN} \\ i_{Co} = z \cdot i_{CMP} - x \cdot i_{AMN} \end{cases}$$

where $i_{Ao}$, $i_{Bo}$, and $i_{Co}$ are the corrected currents of the phase A, the phase B, and the phase C;

finally feeding the corrected three-phase currents back to a current loop of the permanent magnet synchronous motor for control to eliminate imbalance issue of three-phase currents caused by a difference of the scaling error coefficients of three-phase sensors.

\* \* \* \* \*